United States Patent

Henson et al.

[11] 4,089,234
[45] May 16, 1978

[54] ANTI-ROTATING GUIDE FOR RECIPROCATING MEMBERS

[75] Inventors: Ralph B. Henson, Creve Coeur; Noel D. Wiggins, Chillicothe, both of Ill.

[73] Assignee: Caterpillar Tractor Co., Peoria, Ill.

[21] Appl. No.: 777,871

[22] Filed: Mar. 15, 1977

[51] Int. Cl.² ............................................. F16H 53/06
[52] U.S. Cl. .................................... 74/569; 123/90.5; 92/165 PR; 188/67; 403/352
[58] Field of Search ................ 123/90.5, 90.48, 90.51, 123/90.6, 90.18; 74/569, 531; 188/83, 67, 166; 403/352; 308/4 R; 92/165 PR

[56] References Cited

U.S. PATENT DOCUMENTS

| | | | |
|---|---|---|---|
| 2,483,779 | 10/1949 | Mucher | 188/83 |
| 2,548,342 | 4/1951 | Brook et al. | 74/569 X |
| 3,267,919 | 8/1966 | Wortman | 123/90.5 X |
| 3,521,633 | 7/1970 | Yahner | 188/83 X |
| 3,795,229 | 3/1974 | Weber | 123/90.5 |

*Primary Examiner*—Charles J. Myhre
*Assistant Examiner*—Jeffrey L. Yates
*Attorney, Agent, or Firm*—James R. Bell

[57] ABSTRACT

A reciprocating member and a retainer cooperate to limit rotation of the reciprocating member in a bore. Grooves in the reciprocating member cooperate with corresponding portions of a retainer to guide the reciprocating member and limit rotation of the member in the bore due to the compressive engagement of a portion of the retainer by the bore.

5 Claims, 3 Drawing Figures

ANTI-ROTATING GUIDE FOR RECIPROCATING MEMBERS

BACKGROUND OF THE INVENTION

1. Field of the Invention

This invention relates generally to internal combustion engines and more particularly to preventing rotation of poppet valve operating mechanisms such as tappets.

2. Description of the Prior Art

Guide and anti-rotation devices normally limit roller type valve lifters from rotating during engine operation to prevent skewing of the roller relative to an engaged lobe of a camshaft. These devices usually require some external connection to the lifter in order to limit rotation. A problem in using such external connection is that it permits contamination of the bore within which the lifter reciprocates. Also in some engine applications the lifter bore may be located between engine compartments which must be sealed apart. It would be advantageous to have an anti-rotating lifter guide capable of being enclosed within the lifter bore.

SUMMARY OF THE INVENTION

The present invention is directed to overcoming one or more of the problems as set forth above.

According to the present invention this is accomplished by providing an anti-rotating guide for reciprocating members comprising a spool member reciprocably mounted within a bore, the spool having a first groove radially annularly formed therein. An elongated second groove including a first end formed with the first groove extends therefrom axially along the spool and terminates within the bore at a closed second end. A retainer includes an annular radially flexible first portion in the first groove being of a construction sufficient to be compressed by the bore and an elongated second portion extending into the second groove.

The foregoing and other advantages and novel features will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike

DESCRIPTION OF THE PREFERRED EMBODIMENT

Figure 1:
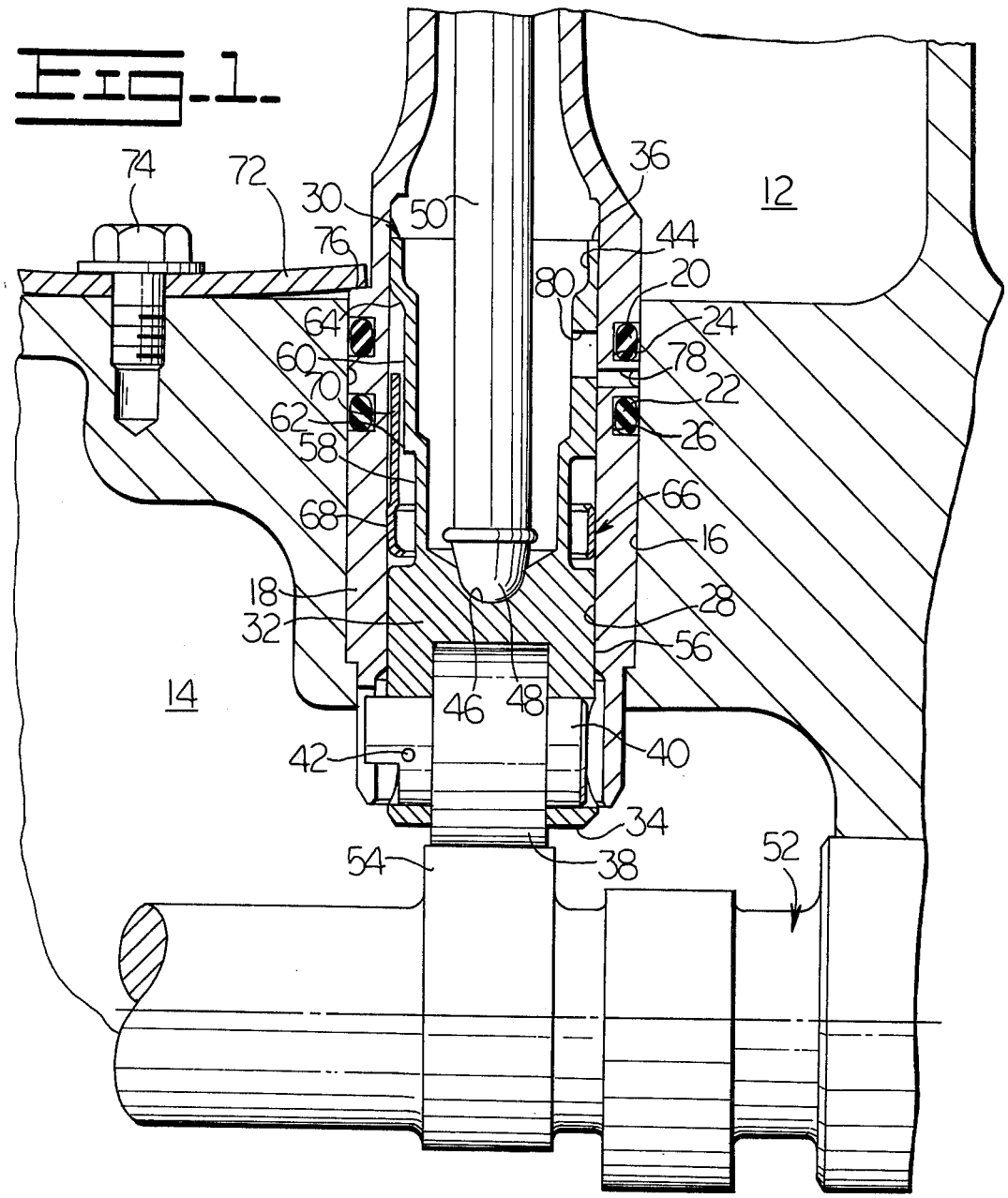
FIG. 1 is a cross-sectional side elevation illustrating the valve lifter and retainer of this invention operatively mounted in an engine.

Referring now to FIG. 1, a portion of an internal combustion engine 10 separates an air compartment 12 from an oil compartment 14. A first bore 16 is formed through the engine 10 interconnecting the compartments 12, 14.

A tubular sleeve or barrel 18 formed of a suitable metal is inserted through the bore 16 and sealingly separates the respective compartments 12, 14 due to the use of well known sealing "0" rings 20, 22 provided in grooves 24, 26, respectively. A second bore 28 formed through sleeve 18 operatively accommodates a valve lifter 30 for reciprocating movement therein. Sleeve 18 is retained in bore 16 due to flexible retainer plate 72 mounted on engine 10 by bolt 74 engaging land 76 formed on sleeve 18.

The lifter is formed of a suitable metal and comprises a cylindrical spool-like body portion 32 having a first end 34 and a second end 36. First end 34 includes a roller 38 rotatably mounted on a shaft 40 secured in place by retaining pins 42. Second end 36 includes counterbore 44 terminating in a receptacle 46 for accommodating lower end 48 of a push rod 50. As it is well known, push rod 50 is resiliently biased (not shown) into engagement with spool 32. A camshaft 52 is rotatably mounted in the engine to have a cam lobe 54 thereof engage roller 38 to reciprocate lifter 30 and associated push rod 50 in a conventional manner. Pressure relief passages 78, 80 are provided in sleeve 18 and spool 32, respectively, to vent bores 16, 28 and prevent pressure lock binding of spool 32.

Outer annular surface 56 of spool 32 includes a first groove 58 radially annularly formed therein adjacent second bore 28. An elongated second groove 60 including a first end 62 is integratedly formed with first groove 58 and is normally disposed therewith so as to extend therefrom axially along spool 32 adjacent second bore 28 and terminates within bore 28 at a closed second end 64.

Figures 2, 3:
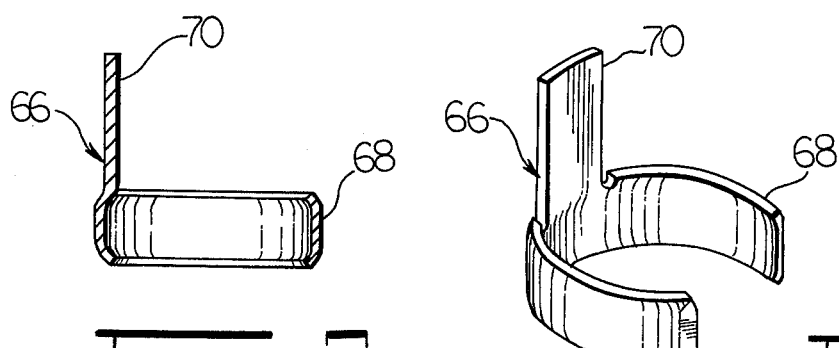
FIG. 2 is a cross-sectional side elevation illustrating the retainer of this invention.
FIG. 3 is an isometric view illustrating the retainer of this invention.

Retainer 66 includes an annular radially flexible first portion 68 in first groove 58. The first portion 68 of retainer 66 is preferably semi-cylindrical and formed of a suitable resilient steel having a free or relaxed FIG. 3 diameter greater than the diameter of second bore 28 to effect a substantially tight anti-rotating press-fit relationship with bore 28 when installed therein. Thus, first portion 68 is of a construction sufficient to be compressed by the bore 28. An elongated second portion 70 of retainer 66 is integratedly formed with first portion 68 and is normally disposed therewith so as to extend along second groove 60 and terminate therein. An axial cross-section of semi-cylindrical retainer first portion 68, as shown in FIG. 2, is arcuate to increase strength and resilient properties thereof and also to permit ease of installation when relatively larger diameter retainer 66 is inserted into relatively smaller diameter bore 28.

OPERATION

When the above-mentioned parts are assembled as illustrated and described, it can be seen that compressive engagement of first portion 68 within bore 28 is sufficient to limit rotation of lifter 30. Also, extension of second portion 70 into groove 60 guides reciprocating lifter spool 32. Thus, the reciprocating spool 32 cooperates with retainer 66 in an enclosed environment to limit rotation of spool 32 in bore 28 for limiting skewing of roller 38 relative to its engaged lobe 54 of camshaft 52.

The foregoing has described an anti-rotating lifter guide capable of being enclosed within a lifter bore between engine compartments which must be sealed apart.

The embodiments of the invention in which an exclusive property or privilege is claimed are defined as follows:

1. An anti-rotating guide for a reciprocating member comprising:
   a spool member reciprocally mounted within a bore, the spool having a first groove radially annularly formed therein adjacent the bore and an elongated second groove including a first end communicating with the first groove and extending therefrom substantially axially along the spool adjacent the bore and terminating within the bore at a closed second end; and a retainer mounted on the spool, the retainer having an annular radially flexible first portion of the retainer in the first groove being of a construction sufficient to be compressed by the bore and an elongated second portion of the retainer extending along the second groove and terminating therein.

2. The anti-rotating guide of claim 1 wherein:
the second groove is normally disposed with the first groove.

3. The anti-rotating guide of claim 2 wherein:
the second portion of the retainer is integratedly formed with the first portion.

4. The anti-rotating guide of claim 3 wherein:
the second portion of the retainer is normally disposed with the first portion.

5. The anti-rotating guide of claim 4 wherein:
the first portion of the retainer is of an arcuate axial crosssectional configuration.

* * * * *